United States Patent
Nagase et al.

(10) Patent No.: US 9,908,269 B2
(45) Date of Patent: Mar. 6, 2018

(54) FORMED LIGNEOUS BODY AND METHOD OF PRODUCING THE SAME

(71) Applicant: KOJIMA INDUSTRIES CORPORATION, Toyota-Shi (JP)

(72) Inventors: Kimihiro Nagase, Toyota (JP); Kozo Kanayama, Nagoya (JP); Tsunehisa Miki, Nagoya (JP); Ichinori Shigematsu, Nagoya (JP); Masako Seki, Nagoya (JP)

(73) Assignee: Kojima Industries Corporation, Toyota-Shi (JP)

( * ) Notice: Subject to any disclaimer, the term of this patent is extended or adjusted under 35 U.S.C. 154(b) by 78 days.

(21) Appl. No.: 14/717,021

(22) Filed: May 20, 2015

(65) Prior Publication Data

US 2015/0343838 A1    Dec. 3, 2015

(30) Foreign Application Priority Data

May 27, 2014  (JP) .................... 2014-109491

(51) Int. Cl.
*B32B 3/10* (2006.01)
*B29C 43/18* (2006.01)
(Continued)

(52) U.S. Cl.
CPC .............. *B29C 43/18* (2013.01); *B29C 43/20* (2013.01); *B44C 5/043* (2013.01); *B44C 5/0453* (2013.01);
(Continued)

(58) Field of Classification Search
None
See application file for complete search history.

(56) References Cited

U.S. PATENT DOCUMENTS 4,911,969 A    3/1990  Ogata et al.
4,963,214 A  * 10/1990  Iwata ...................... B32B 27/04
                                               156/154
(Continued)

FOREIGN PATENT DOCUMENTS

CN    101108501 A    1/2008
JP    S48-7599 U     1/1973
(Continued)

OTHER PUBLICATIONS

Chinese Office Action, Chinese Application No. 201510276566.1, dated Dec. 27, 2016 (10 pages).
(Continued)

*Primary Examiner* — Christopher Polley
(74) *Attorney, Agent, or Firm* — Burr & Brown, PLLC

(57) ABSTRACT

A formed ligneous body having a highly original and excellent design and exhibiting a novel handsome appearance is provided, and a method of making the formed ligneous body. The formed ligneous body includes a translucent base portion, and decorative spot portions whose degree of translucency is different from that of the base portion and which are integrated with the base portion. The base portion and the decorative spot portion are formed of respective resin-impregnated ligneous materials having respective different color tones. The base portion is formed with a predetermined thickness, while the decorative spot portions are integrally embedded within and/or exposed on at least one of front and back surfaces of the base portion in a predetermined pattern of local arrangement.

11 Claims, 9 Drawing Sheets

(51) Int. Cl.
- *B44C 5/04* (2006.01)
- *B29C 43/20* (2006.01)
- *B29K 33/04* (2006.01)
- *B29K 711/14* (2006.01)
- *B29K 311/14* (2006.01)
- *B29L 31/00* (2006.01)

(52) U.S. Cl.
CPC .... *B29C 2043/182* (2013.01); *B29K 2033/04* (2013.01); *B29K 2311/14* (2013.01); *B29K 2711/14* (2013.01); *B29K 2995/0018* (2013.01); *B29L 2031/722* (2013.01); *Y10T 428/24802* (2015.01)

(56) References Cited

U.S. PATENT DOCUMENTS

| | | | |
|---|---|---|---|
| 6,352,784 B1 * | 3/2002 | Katagiri | B27D 1/00 156/244.11 |
| 2008/0020222 A1 | 1/2008 | Hiraku et al. | |

FOREIGN PATENT DOCUMENTS

| | | |
|---|---|---|
| JP | S60-184804 A | 9/1985 |
| JP | 4502848 B2 | 7/2010 |
| JP | 2012-011749 A | 1/2012 |
| JP | 4849609 B2 | 1/2012 |
| JP | 2012-161932 A1 | 8/2012 |
| JP | 2012-161933 A1 | 8/2012 |
| JP | 2013-075449 A | 4/2013 |
| JP | 2013-075449 A1 | 4/2013 |

OTHER PUBLICATIONS

U.S. Appl. No. 14/716,981, filed May 20, 2015, Nagase et al.

U.S. Appl. No. 14/793,031, filed Jul. 7, 2015, Nagase et al.

Japanese Office Action (with English Translation), Japanese Application No. 2014-109491, dated Dec. 26, 2017 (7 pages).

* cited by examiner

FORMED LIGNEOUS BODY AND METHOD OF PRODUCING THE SAME

CROSS REFERENCE TO RELATED APPLICATION

The present application is based on Japanese Patent Application No. 2014-109491 filed on May 27, 2014 the contents of which are incorporated herein by reference.

BACKGROUND OF THE INVENTION

Field of the Invention

The present invention relates generally to a formed ligneous body, and a method of producing the same, and more particularly to a formed ligneous body exhibiting a novel handsome appearance, and a method which permits advantageous production of the formed ligneous body.

BACKGROUND ART

Description of Related Art

There have been widely used formed ligneous bodies formed of various kinds of lumber (timber) and bamboo, as components of architectural floor panels, furniture and fittings. In the field of automotive vehicles, for example, formed ligneous bodies have been utilized as decorative design parts or members such as outer panels and surface panels of interior parts of the automotive vehicles. Further, recent diversity of users' desires or demands relating to the decorative design requires formed ligneous bodies having high degrees of originality and excellence in design.

Under the circumstances described above, JP-A-2013-75449 discloses a translucent decorative member which is a laminar body including a sliced veneer layer, a veiling layer and a decorative layer. The sliced veneer layer is formed from a translucent thin ligneous sheet which has a desired woody grain, and which is obtained by a WPC (Wood Plastic Combination) process in which the ligneous sheet is impregnated with a resin material, and the veiling layer has a predetermined degree of translucency, while the decorative layer also has translucency and a woody grain pattern having a desired woody grain or a desired tone of color.

In the translucent decorative member described above, the WPC process permits the sliced veneer layer in the form of the thin ligneous sheet to have a sufficiently high degree of translucency, without a need of considerably reducing the thickness of the thin ligneous sheet, so that the woody grain pattern of the decorative layer can be clearly and definitely seen on the side of the front surface of the translucent decorative member, together with the woody grain on the surface of the thin ligneous sheet when the translucent decorative member is exposed to a light incident from the side of its back surface. Thus, the woody grain of the sliced veneer layer and the woody grain pattern of the decorative layer are observed in combination with each other, giving the translucent decorative member an enhanced natural appearance in terms of its sliced veneer.

However, the decorative design of the prior art decorative member is based on a conventionally used woody grain, and does not sufficiently satisfy the users' desires for enhanced originality in design. Further, this decorative member requires formation of the veiling layer for veiling the woody grain pattern of the decorative layer, and printing of the woody grain pattern on the decorative layer, giving rise to a potential drawback of an increased cost of manufacture of the decorative member.

On the other hand, Japanese Patent No. 4502848 and Japanese Patent No. 4849609 disclose a formed ligneous body produced by utilizing a so-called "flow molding" process, and a method of producing such a formed ligneous body. The formed ligneous body produced by utilizing the flow molding process described above has not only an advantage regarding the preservation of resources and environment, but also an advantage of presenting a genuine lumber feel. Further, JP-A-2012-161932 and JP-A-2012-161933 disclose a method of producing a formed body of a plant-derived material, wherein the plant-derived material is subjected to a lateral extrusion molding process. In this respect, it is noted in particular that JP-A-2012-161932 discloses a step of impregnating the plant-derived material with an additive (resin material) and a step of subjecting the plant-derived material to a heating and pressing process to form the plant-derived material into a desired shape. These steps permit an easy flow of the plant-derived material, making it possible to assure a high degree of uniformity of dynamic properties of the formed body.

However, the formed ligneous body produced by utilizing the flow molding process having the several advantages suffers from the following drawback. Namely, the flow of the entirety of the ligneous material within a forming cavity undesirably causes a high risk that the formed ligneous body has surface patterns or figures which are deformed with respect to a woody grain, or aesthetically deteriorated. In addition, where a plurality of sheets of ligneous materials are subjected to the lateral extrusion molding process disclosed in JP-A-2012-161932 and JP-A-2012-161933, there is a high risk that the formed ligneous body has undesirable striped patterns or stripes of different color tones at a boundary between the adjacent sheets. Thus, the technique to produce the formed ligneous body by utilizing the conventional flow molding process has extreme difficulty to obtain the formed ligneous body which can satisfy the users' desires or demands for enhanced originality and excellence in its design.

SUMMARY OF THE INVENTION

The present invention was made in view of the background art described above. It is therefore a first object of this invention to provide a formed ligneous body which has high degrees of originality and excellence in design and exhibits a novel handsome appearance, owing to properties of ligneous materials which are subjected to an effective flow molding process and which can be given translucency by impregnation with resin materials. It is a second object of the invention to provide a method which permits advantageous production of such a formed ligneous body.

The first object indicated above can be achieved according to a first aspect of the present invention, which provides a formed ligneous body which has a front decorative design surface and which is formed of ligneous materials each impregnated with a resin material, by subjecting the ligneous materials to a flow molding process in which the ligneous materials are heated and pressed such that the ligneous materials are forced to flow and shaped while the ligneous materials are compressed, the formed ligneous body comprising: a base portion having translucency and a plurality of decorative spot portions whose degree of translucency is different from that of the base portion and which are integrated with the base portion, the base portion and the decorative spot portions being formed of respective resin-impregnated ligneous materials having respective different color tones, the base portion being formed with a predetermined thickness, while the plurality of decorative spot portions being disposed in a predetermined pattern of local arrangement, such that each of the plurality of decorative spot portions being integrally embedded within or exposed on a front or back surface of the base portion.

In one preferred form of the formed ligneous body according to the first aspect of the invention, either one of the respective resin-impregnated ligneous materials of the base portion and the decorative spot portions is formed by using a peripheral portion of a lumber, while the other of the respective resin-impregnated ligneous materials is formed by using a core portion of a lumber.

In other preferred form of the formed ligneous body according to the first aspect of the invention, either one of the respective resin-impregnated ligneous materials of the base portion and the decorative spot portions is subjected to a bleaching treatment.

In other preferred form of the formed ligneous body according to the first aspect of the invention, the respective resin-impregnated ligneous materials of the base portion and the decorative spot portions are impregnated with a melamine resin.

The present invention also provides an automotive vehicle interior part consisting of the formed ligneous body according to the first aspect of the invention.

The above-indicated second object can be achieved according to a second aspect of the invention, which provides a method of producing the formed ligneous body according to the first aspect of the invention, the method comprising the steps of: (a) providing a plurality of base-portion sheets for forming the base portion, and a plurality of decorative-spot-portion segments for forming the plurality of decorative spot portions, by using respective ligneous materials which have respective different color tones and which are impregnated with resin materials; (b) superposing the plurality of base-portion sheets on each other, disposing the plurality of decorative-spot-portion segments in a predetermined pattern of local arrangement, such that each of the plurality of decorative-spot-portion segments is embedded between adjacent ones of the base-portion sheets or exposed on at least one of an upper surface of an uppermost one of the base-portion sheets and a lower surface of a lowermost one of the base-portion sheets, and accommodating the plurality of base-portion sheets and the plurality of decorative-spot-portion segments within a forming cavity for forming the formed ligneous body; and (c) subjecting the plurality of base-portion sheets and the plurality of decorative-spot-portion segments accommodated within the forming cavity, to a flow molding process in which the base-portion sheets and the decorative-spot-portion segments are compressed in a direction of superposition of the base-portion sheets, and in which the resin materials contained in the base-portion sheets and the decorative-spot-portion segments are cured or solidified, so that the base portion and the decorative spot portions are integrated with each other, such that each of the plurality of decorative spot portions is embedded within or exposed on the front or back surface of the base portion formed with the predetermined thickness.

The above-indicated second object can also be achieved according to a third aspect of the invention, which provides a method of producing the formed ligneous body according to the first aspect of the invention, the method comprising the steps of: (a) providing a plurality of base-portion segments for forming the base portion, and a plurality of decorative-spot-portion segments for forming the plurality of decorative spot portions, by using respective ligneous materials which have respective different color tones and which are impregnated with resin materials; (b) accommodating the plurality of base-portion segments and the plurality of decorative-spot-portion segments in a forming cavity for forming the formed ligneous body such that the plurality of base-portion segments and the plurality of decorative-spot-portion segments are superposed on each other and such that the decorative-spot-portion segments are locally arranged at predetermined positions; and (c) subjecting the plurality of base-portion segments and the plurality of decorative-spot-portion segments accommodated within the forming cavity, to a flow molding process in which the base-portion segments and the decorative-spot-portion segments are compressed in a direction of superposition of the base-portion segments and the decorative-spot-portion segments, and in which the resin materials contained in the base-portion segments and the decorative-spot-portion segments are cured or solidified, so that the base portion and the decorative spot portions are integrated with each other, such that each of the plurality of decorative spot portions is embedded within or exposed on the front or back surface of the base portion formed with the predetermined thickness.

The above-indicated second object can also be achieved according to a fourth aspect of the invention, which provides a method of producing the formed ligneous body according to the first aspect of the invention, the method comprising the steps of: (a) providing two base-portion sheets and a plurality of base-portion segments for forming the base portion, and a plurality of decorative-spot-portion segments for forming the plurality of decorative spot portions, by using respective ligneous materials which have respective different color tones and which are impregnated with resin materials; (b) accommodating the two base-portion sheets, the plurality of base-portion segments and the plurality of decorative-spot-portion segments in a forming cavity for forming the formed ligneous body such that the plurality of base-portion segments and the plurality of decorative-spot-portion segments are interposed between the two base-portion sheets and such that the decorative-spot-portion segments are locally arranged at predetermined positions; and (c) subjecting the two base-portion sheets, the plurality of base-portion segments and the plurality of decorative-spot-portion segments accommodated within the forming cavity, to a flow molding process in which the base-portion sheets, the base-portion segments and the decorative-spot-portion segments are compressed in a direction of superposition of the two base-portion sheets, and in which the resin materials contained in the base-portion sheets, the base-portion segments and the decorative-spot-portion segments are cured or solidified, so that the base portion and the decorative spot portions are integrated with each other, such that each of the plurality of decorative spot portions is embedded within or exposed on the front or back surface of the base portion formed with the predetermined thickness.

In one preferred form of the method according to any one of the second to fourth aspects of the invention, the flow molding process is practiced while the forming cavity is evacuated.

As described above, the formed igneous body according to the first aspect of the present invention is produced by subjecting the resin-impregnated ligneous materials to the flow molding process, and comprises the translucent base portion, and the plurality of decorative spot portions whose degree of translucency is different from that of the base portion and which are integrated with the base portion. The base portion is formed with the predetermined thickness, while each of the plurality of decorative spot portions is integrally embedded within or exposed on the front or back surface of the base portion in the predetermined pattern of local arrangement. Accordingly, the decorative design surface exhibits, for example, a so-called "tortoiseshell" appearance of decoration giving a texture different from that of the prior art formed ligneous body, whereby the present formed ligneous body exhibits a novel handsome appearance.

In addition, the formed ligneous body exhibits a deep three-dimensional excellent appearance in design on the decorative design surface, owing to the formation of the base portion with the predetermined thickness and the embedment and exposure of the plurality of decorative spot portions within and on the front and back surface of the base portion, in the predetermined pattern of local arrangement. Further, the base portion and the decorative spot portions are formed of the ligneous materials each impregnated with a resin material and having respective different color tones or tints, so that the base portion and the decorative spot portions can be given suitably selected different degrees of translucency, and the formed ligneous body is advantageously given excellent scratch-, water- and weather-proof properties.

In the method according to the second aspect of the invention to produce the formed ligneous body, the plurality of base-portion sheets are superposed on each other while each of the plurality of decorative-spot-portion segments is embedded between adjacent ones of the base-portion sheets or exposed on at least one of the upper surface of the uppermost one of the base-portion sheets and the lower surface of the lowermost one of the base-portion sheets. These base-portion sheets and decorative-spot-portion segments are accommodated within the forming cavity, and are subjected to the flow molding process, so that the decorative spot portions are advantageously formed at desired positions, whereby the formed ligneous body exhibits a desired appearance of decoration.

In the method according to the third aspect of this invention to produce the formed ligneous body, both of the base-portion segments and the decorative-spot-portion segments are small-sized pieces which are superposed on each other and locally arranged, so that the base-portion segments and decorative-spot-portion segments are permitted to be subjected to the flow molding process while these base-portion and decorative-spot-portion segments are accommodated in the forming cavity in the predetermined pattern of local arrangement, irrespective of the outer profile of the formed ligneous body to be produced. Accordingly, the same ligneous materials can be used for the production of various kinds of the formed ligneous body, so that the cost of production of the formed ligneous body can be advantageously reduced.

DETAILED DESCRIPTION OF THE INVENTION

To further clarify the present invention, preferred embodiments of the invention will be described in detail by reference to the drawings.

Figure 1:
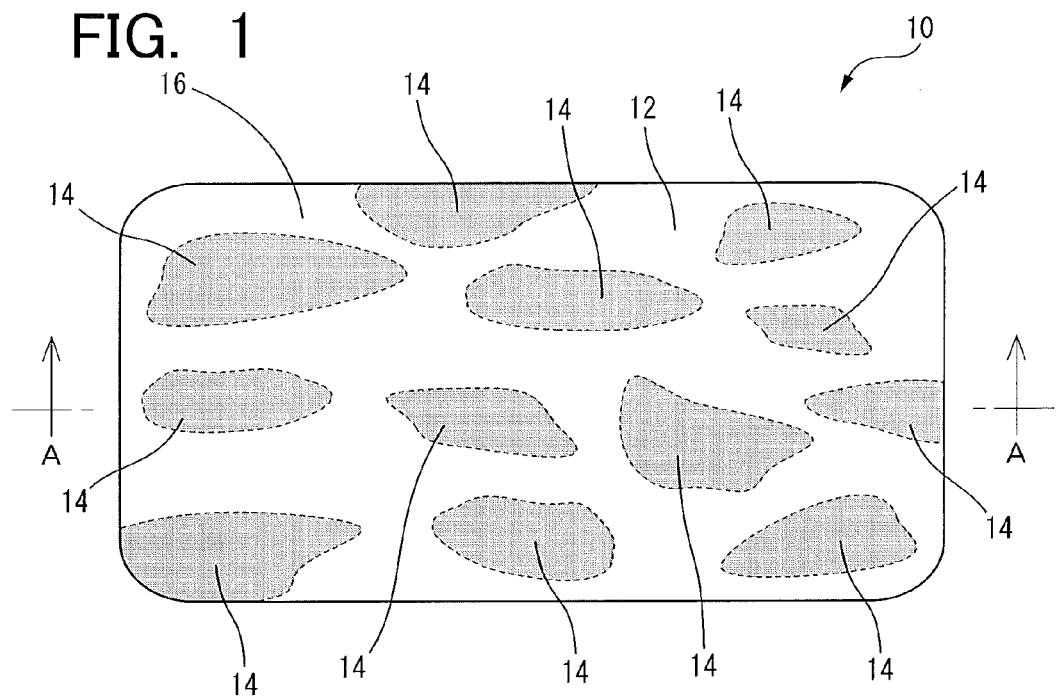
FIG. 1 is a schematic plan view of a formed ligneous body according to one embodiment of this invention.
Figure 2:
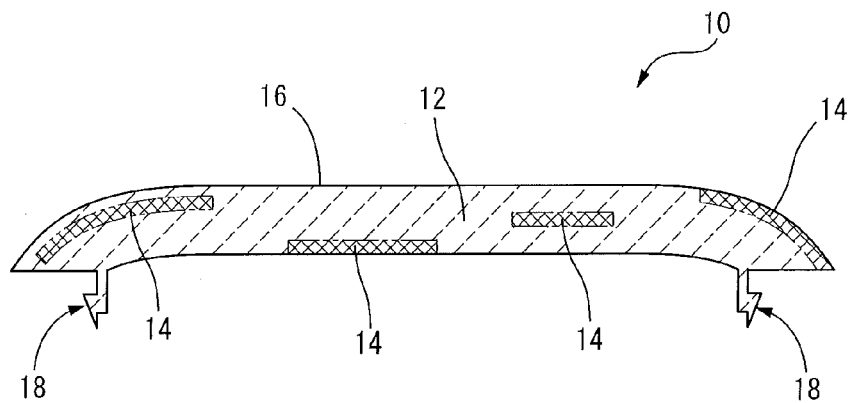
FIG. 2 is a schematic cross sectional view taken along a line A-A in FIG. 1.

Referring to the plan view of FIG. 1 and the cross sectional view of FIG. 2, there is shown a formed ligneous body according to one embodiment of this invention, in the form of an automotive vehicle interior part or member 10. As is apparent from FIGS. 1 and 2, the automotive vehicle interior part 10 (hereinafter referred to simply as an "interior part 10") takes the form of a generally elongate rectangular plate having a relatively large thickness and consisting of a base portion 12 and a plurality of decorative spot portions 14 which are formed integrally with each other. The interior part 10 has a front decorative design surface 16 (shown in the plan view of FIG. 1), which is an upper surface as seen in the cross sectional view of FIG. 2.

Described more specifically, the base portion 12 takes the form of a curved plate having a predetermined thickness, more specifically an average thickness almost equal to that of the interior part 10, while some and the other of the plurality of decorative spot portions 14 are respectively integrally embedded within and exposed on the front and back surfaces of the base portion 12, in a predetermined pattern of local arrangement. In other words, the decorative spot portions 14 are disposed integrally with the base portion 12, at different thickness positions of the base portion 12 which are spaced from the decorative design surface 16 by respective different distances. The front surface of the base portion 12 and the exposed surfaces of the decorative spot portions 14 cooperate to form the decorative design surface 16 of the interior part 10. The base portion 12 is provided with integrally formed fixing hooks 18 which project from the back surface. Each of these fixing hooks 18 has a known structure consisting of a flexible plate-like support portion, and a jaw portion which is formed integrally with the support portion so as to extend from the distal end of the support portion. The fixing hooks 18 are provided to fix the interior part 10 to a predetermined part of an automotive vehicle, with a single pressing action.

In the present embodiment, the interior part 10 is produced as an integral body having a desired shape and consisting of the base portion 12 and the decorative spot portions 14, by a flow molding process, by using ligneous materials (a base-portion ligneous material and a decorative-spot-portion ligneous material, which will be described). Described more specifically, the walls of the fiber cells of the ligneous materials of the base portion 12 and decorative spot portions 14 are impregnated with resin materials in the form of thermosetting resin materials, such as a melamine resin, and the resin materials are cured, so that the base portion 12 and the decorative spot portions 14 have translucency.

In the present embodiment, the base portion 12 and the decorative spot portions 14 are formed of respective ligneous materials which are impregnated with the resin materials and which have respective different color tones or tints. For example, the base portion 12 is formed of a peripheral portion of agathis or any other lumber (timber) having a comparatively light or pale color, while the decorative spot portions 14 are formed of a core portion of cedar or any other lumber (timber) having a comparatively deep color. Accordingly, the base portion 12 and the decorative spot portions 14 have respective different degrees of translucency, so that the plurality of decorative spot portions 14 of a deep brown color are visible on the side of the front surface (the decorative design surface 16) of the interior part 10, through the translucent base portion 12, as shown in FIG. 1. Thus, the decorative design surface 16 exhibits a so-called "tortoiseshell" appearance of decoration.

The interior part 10 having the structure described above can be advantageously produced by a method which will be described.

Namely, the base-portion ligneous material and the decorative-spot-portion ligneous material to form the respective base portion 12 and decorative spot portions 14 of the desired interior part 10 are initially provided.

Described more specifically, a plurality of (four in this specific example) base-portion sheets 20 are provided as the base-portion ligneous material. Each of the base-portion sheets 20 is a relatively thin elongate rectangular flat sheet, which is sliced from an agathis lumber. Each base-portion sheet 20 has an outer profile smaller than that of the interior part 10. It is noted that the "outer profile" is interpreted to mean a projection surface area of each member (the base-portion sheet 20, the interior part 10) as seen in a direction perpendicular to its plane (plane of FIG. 1).

On the other hand, a plurality (12 in this specific example) of decorative-spot-portion segments 22 are provided as the decorative-spot-portion ligneous material. Each of the decorative-spot-portion segments 22 is a small-sized rectangular piece sliced from a cedar lumber. Each decorative-spot-portion segment 22 has an outer profile considerably smaller than that of the base-portion sheets 20. Further, the plurality of decorative-spot-portion segments 22 do not have the same outer profile, but have different outer profiles which are suitably selected.

The thus provided base-portion sheets 20 and decorative-spot-portion segments 22 are impregnated with the melamine resin such that the melamine resin is contained in the fiber cells constituting a ligneous structure, and in the walls of the fiber cells which are principally composed of cellulose. In the present embodiment, an aqueous solution of the melamine resin is initially accommodated in a bath disposed within a suitable pressure vessel, and the base-portion sheets 20 and the decorative-spot-portion segments 22 are immersed in the aqueous solution of the melamine resin, so that the fiber cells of the base-portion sheets 20 and the decorative-spot-portion segments 22 are impregnated with the aqueous solution of the melamine resin, by a so-called "evacuating and pressurizing process" in which the pressure within the pressure vessel is reduced and raised to introduce the aqueous solution of the melamine resin into the fiber cells of the base-portion sheets 20 and the decorative-spot-portion segments 22.

While the molecular weight of the melamine resin in the aqueous melamine resin solution accommodated in the above-described bath is not particularly limited, the average molecular weight of the melamine resin is preferably as small as not larger than about 2000, because the average molecular weight of the melamine resin larger than 2000 is excessively large, giving rise to a risk of difficulty and an excessively small amount of impregnation of the fiber cells of the base-portion sheets 20 and the decorative-spot-portion segments 22 with the melamine resin, and a consequent insufficient effect of impregnation of the base-portion sheets 20 and the decorative-spot-portion segments 22 with the melamine resin.

While the concentration of the aqueous melamine resin solution accommodated in the bath is not particularly limited, the concentration is preferably within a range of about 10-50% on the weight basis, because the concentration of the aqueous melamine resin solution less than 10% gives rise to a risk of insufficiency of the amount of impregnation of the base-portion sheets 20 and the decorative-spot-portion segments 22 with the melamine resin, and a consequent insufficient effect of impregnation of the base-portion sheets 20 and the decorative-spot-portion segments 22 with the melamine resin, while the concentration of the aqueous melamine resin solution more than 50% gives rise to a risk of an excessively large amount of impregnation of the base-portion sheets 20 and the decorative-spot-portion segments 22 with the melamine resin, and a consequent excessive amount of increase of the weight of the interior part 10 to be obtained as the end product.

Subsequently, the base-portion sheets 20 and the decorative-spot-portion segments 22 impregnated with the aqueous melamine resin solution are taken out of the pressure vessel, and are left in the atmosphere, or subjected to a blow of hot air, so that the base-portion sheets 20 and the decorative-spot-portion segments 22 are dried, whereby the walls of the fiber cells of the base-portion sheets 20 and the decorative-spot-portion segments 22 are efficiently impregnated with the aqueous melamine resin solution contained in those fiber cells.

As a result of impregnation of the fiber cell walls of the base-portion sheets 20 and the decorative-spot-portion segments 22 with the aqueous melamine resin solution, the molecules of the melamine resin are adsorbed among molecular chains of the fiber cells (cellulose) of the base-portion sheets 20 and the decorative-spot-portion segments 22 which are cross-linked by hydrogen bonds, so that the hydrogen bonds are cut. Therefore, the present embodiment is configured such that a step of cutting the hydrogen bonds of the fiber cells of the base-portion sheets 20 and the decorative-spot-portion segments 22 is implemented concurrently with a step of impregnating the base-portion sheets 20 and the decorative-spot-portion segments 22 with the aqueous melamine resin solution, and a step of drying the base-portion sheets 20 and the decorative-spot-portion segments 22.

As described above, the plurality of base-portion sheets 20 impregnated with the melamine resin are provided as the base-portion ligneous material, and the plurality of decorative-spot-portion segments 22 impregnated with the melamine resin are provided as the decorative-spot-portion ligneous material.

Then, the base-portion sheets 20 and the decorative-spot-portion segments 22 which have been provided as described above are subjected to the flow molding process, by using a heating and pressing device 24, as shown in FIGS. 3-6.

As is apparent from FIGS. 3-6, the heating and pressing device 24 used in the present embodiment has a forming mold 26. This forming mold 26 includes a lower die 28, and an upper die 30 which is disposed above and in opposition to the lower die 28 with a predetermined distance therebetween.

The lower die 28 of the forming mold 26 is movable in the vertical direction by a predetermined distance, by a moving device (not shown) which includes a hydraulic cylinder or the like and which has a structure known in the art. The lower die 28 has a recess 32 open in its upper surface. This recess 32 has an inner surface of a generally elongate rectangular shape, which serves as a downwardly curved cavity surface 34 which corresponds to the decorative design surface 16 of the interior part 10. Further, the lower die 28 has a plurality of cartridge heaters 36 embedded therein in the vicinity of the cavity surface 34. These cartridge heaters 36 are controlled of their heating temperature, by a controller not shown, so that the cavity surface 34 is heated to a predetermined temperature by the cartridge heaters 36 under the control of the controller.

On the other hand, the upper die 30 includes a first split-die member 38 disposed in its central part, and a second split-die member 40 and a third split-die member 42 which are disposed on opposite sides of the first split-die member 38 and opposed to each other in a longitudinal direction (right and left direction as seen in FIGS. 3-6) of the recess 32. In the present embodiment, the first split-die member 38 is fixed in position, and the second split-die member 40 and the third split-die member 42 are movable toward and away from the first split-die member 38, by hydraulic cylinders or any other known moving devices not shown. Movements of the second and third split-die members 40 and 42 toward the first split-die member 38 cause abutting contact of the first, second and third split-die members 38, 40 and 42 with each other on their mutually opposed surfaces. These opposed surfaces of the first, second and third split-die members 38, 40 and 42 in abutting contact with each other define fixing-hook forming cavities 44 which are open downwards, and which are provided to form the above-described fixing hooks 18 integrally with the back surface of the base portion 12 (the interior part 10).

The first split-die member 38 has a curved lower surface functioning as a first pressure surface 46, while the second and third split-die members 40 and 42 have respective flat lower surfaces functioning as respective second and third pressure surfaces 48 and 50. In the present embodiment, the cavity surface 34 of the lower die 28, and the pressure surfaces 46, 48 and 50 of the upper die 30 (the split-die members 38, 40 and 42) cooperate to define a forming cavity 52 for forming the desired formed ligneous body. Each of the split-die members 38, 40 and 42 has a plurality of cartridge heaters 36 or one cartridge heater 36 embedded therein in the vicinity of the pressure surfaces 46, 48 and 50. Like the cartridge heaters 36 embedded in the lower die 28, the cartridge heaters 36 of the upper die 30 are controlled of their heating temperatures, by the controller not shown, so that the pressure surfaces 46, 48 and 50 are heated to predetermined temperatures by the cartridge heaters 36 under the control of the controller.

Figure 3:
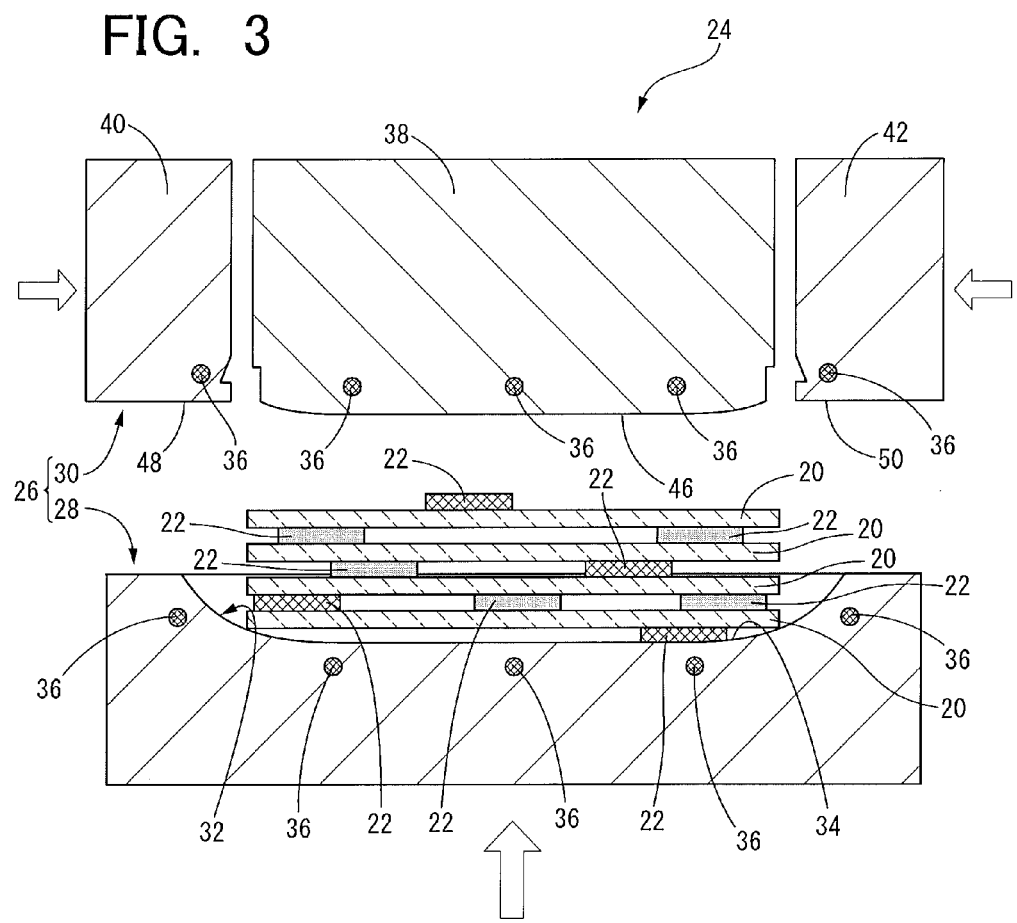
FIG. 3 is a schematic cross sectional view showing an example of a step of a method of producing the formed ligneous body of FIG. 1, when a base-portion ligneous material and a decorative-spot-portion ligneous material are set in a forming mold of a heating and pressing device.

To perform flow molding with respect to the base-portion sheets 20 and the decorative-spot-portion segments 22, by using the heating and pressing device 24 having the thus constructed forming mold 26, the plurality of base-portion sheets 20 and the decorative-spot-portion segments 22 are accommodated in the recess 32 of the lower die 28 such that the sheets 20 and segments 22 are superposed on each other in a predetermined pattern of local arrangement, as shown in FIG. 3, while the upper die 30 and the lower die 28 are vertically spaced apart from each other.

Figure 4:
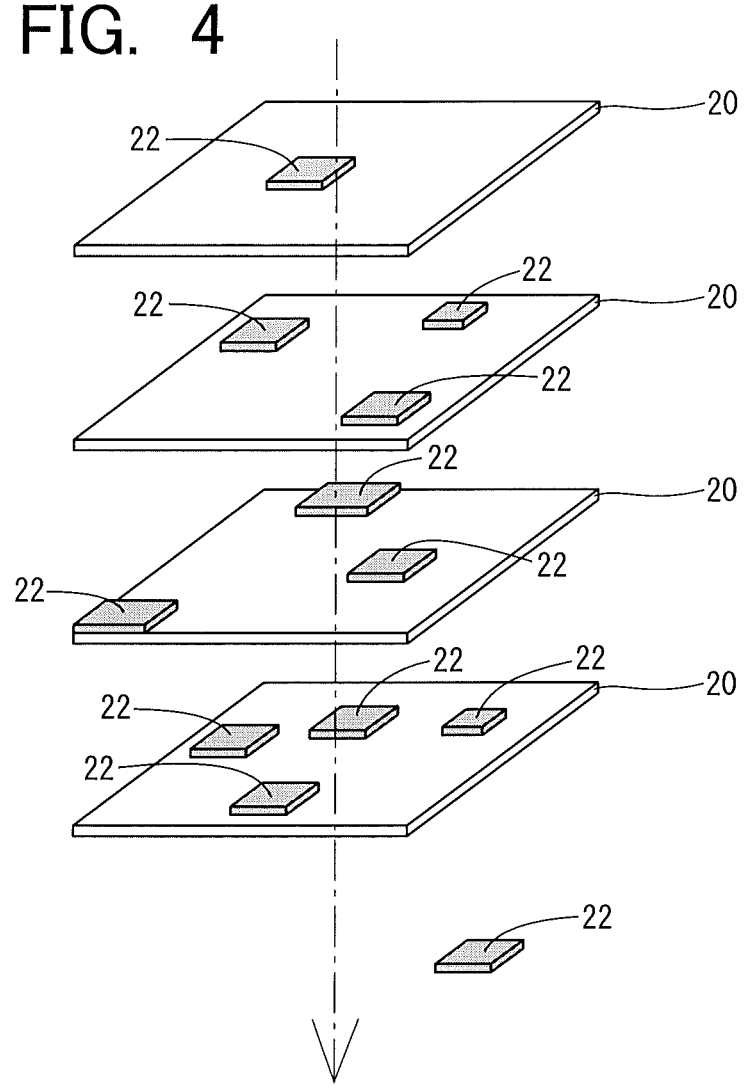
FIG. 4 is a schematic perspective view illustrating the base-portion ligneous material and the decorative-spot-portion ligneous material which are superposed on each other in the step shown in FIG. 3.

Namely, the plurality of base-portion sheets 20 are superposed on each other, while the plurality of decorative-spot-portion segments 22 are locally arranged (distributed) at predetermined respective positions between the adjacent ones of the base-portion sheets 20, and on the upper surface of the uppermost one of the base-portion sheets 20 and on the lower surface of the lowermost one of the base-portion sheets 20 (in contact with the cavity surface 34) (as seen in FIGS. 3 and 4), as also schematically illustrated in FIG. 4.

After or before the plurality of base-portion sheets 20 and the plurality of decorative-spot-portion segments 22 are positioned with respect to the recess 32 as described above, the cavity surface 34 of the lower die 28 and the first, second and third pressure surfaces 46, 48 and 50 of the first, second and third split-die members 38, 40 and 42 of the upper die 30 are heated by the cartridge heaters 36 embedded in those lower and upper dies 28 and 30 (the split-die members 38, 40 and 42), to the curing point of the melamine resin contained in the base-portion sheets 20 and the decorative-spot-portion segments 22, and the cavity surface 34 and the pressure surfaces 46, 48 and 50 are kept at this temperature. Described more specifically, the cavity surface 34 and the pressure surfaces 46, 48 and 50 are heated to and kept at a temperature of about 150° C. Although the optimum heating temperature of the cavity surface 34 and the pressure surfaces 46, 48 and 50 is influenced by the curing and melting points of the resin material used to impregnate the base-portion sheets 20 and the decorative-spot-portion segments 22, the optimum temperature is generally selected within a range of about 100-200° C.

Figure 5:
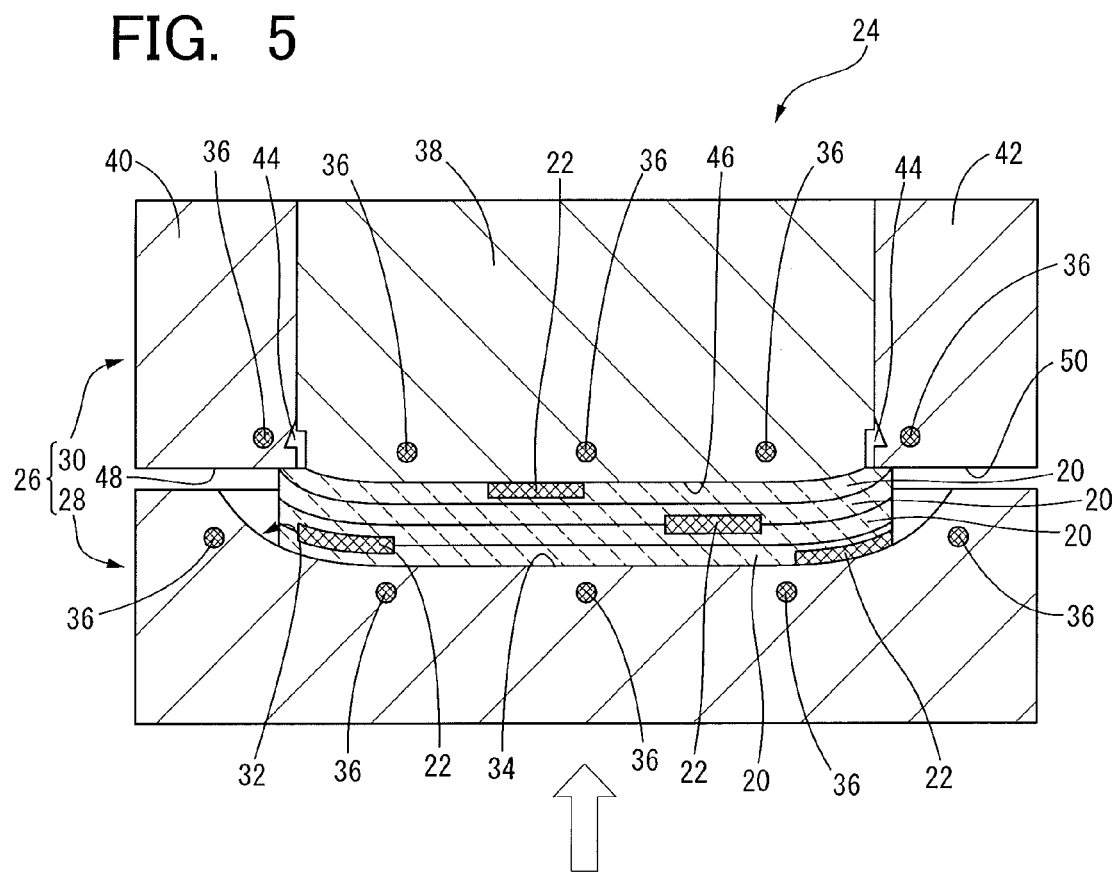
FIG. 5 is a schematic cross sectional view showing an example of a step implemented following the step shown in FIG. 3, when an upper die of the forming mold has been brought into an abutting contact with an upper surface of the base-portion ligneous material in the process of a closing action of the forming mold.

Then, the second and third split-die members 40 and 42 are brought into abutting contact with the first split-die member 38 to form the upper die 30, while at the same time the lower die 28 is moved upwards, as shown in FIG. 5, so that the plurality of base-portion sheets 20 and the decorative-spot-portion segments 22 are pressed by the first, second and third pressure surfaces 46, 48 and 50 in the direction in which the sheets 20 and segments 22 are superposed on each other.

During the above-described movements of the second and third split-die members 40 and 42 and the lower die 28, the plurality of base-portion sheets 20 and the decorative-spot-portion segments 22 are heated by the heat of the cavity surface 34, and the heat of the first, second and third pressure surfaces 46, 48 and 50, so that the base-portion sheets 20 and the decorative-spot-portion segments 22 as a whole are softened.

It is noted that the hydrogen bonds among the fiber cells of the ligneous materials in the form of the base-portion sheets 20 and the decorative-spot-portion segments 22 have been cut as a result of impregnation of the ligneous materials with the melamine resin, so that the base-portion sheets 20 and the decorative-spot-portion segments 22 are permitted to flow during the above-described heating and pressing operations performed on the sheets 20 and segments 22. Namely, shearing forces act on the fiber cells during the heating and pressing operations on the base-portion sheets 20 and the decorative-spot-portion segments 22, so that the relative positions of the fiber cells are changed, whereby the base-portion sheets 20 and the decorative-spot-portion segments 22 are permitted to flow along the cavity surface 34 and the first, second and third pressure surfaces 46, 48 and 50, and are compacted in the direction of mutual superposition of the sheets 20 and segments 22 and bonded together.

Figure 6:
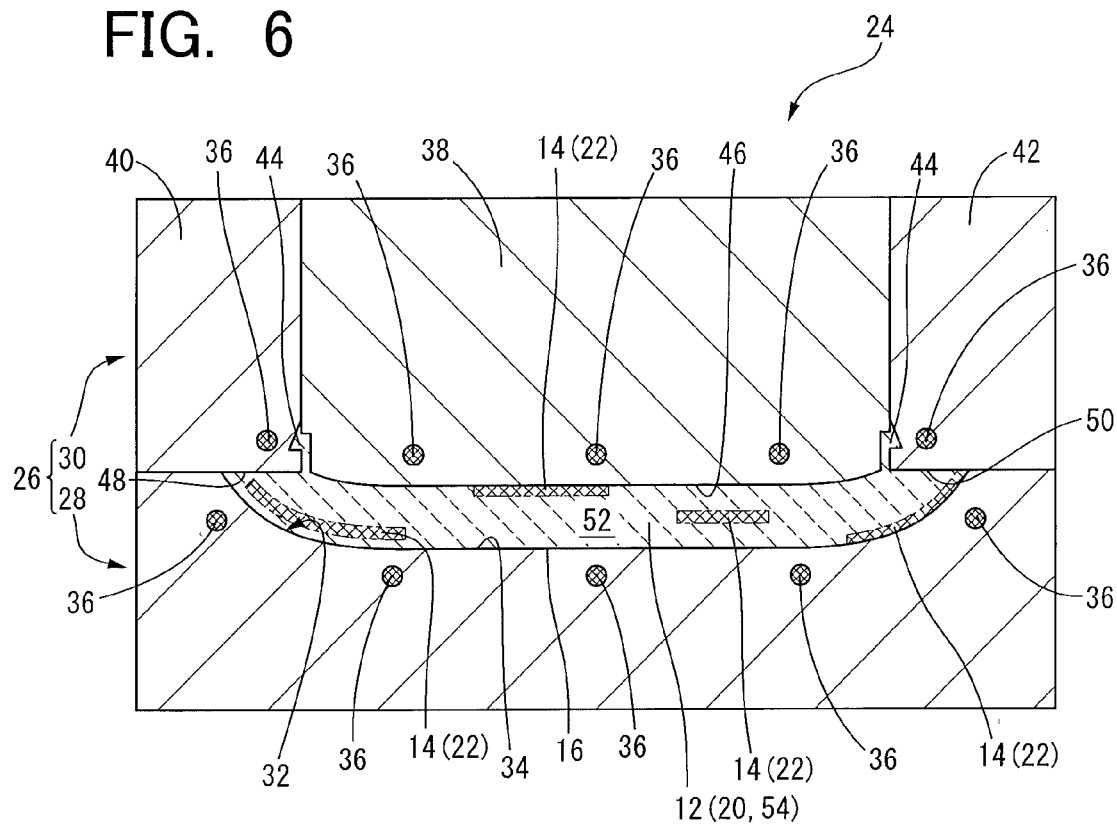
FIG. 6 is a schematic cross sectional view showing an example of a step implemented following the step shown in FIG. 5, in which the base-portion ligneous material and the decorative-spot-portion ligneous material are subjected to a flow molding process performed by the heating and pressing device in a closed state of the forming mold, to form the formed ligneous body.

Subsequently, the lower die 28 is further moved upwards to a position at which the forming cavity 52 is formed between the lower die 28 and the upper die 30, as shown in FIG. 6. As a result, the base-portion sheets 20 and the decorative-spot-portion segments 22 are pressed with a force of about 100t, between the first, second and third pressure surfaces 46, 48 and 50 of the upper die 30 (the first, second and third split-die members 38, 40 and 42) and the cavity surface 34 of the lower die 28, in the direction of mutual superposition of those sheets 20 and segments 22. The base-portion sheets 20 and the decorative-spot-portion segments 22 being thus pressed are heated by the cavity surface 34 and the first, second and third pressure surfaces 46, 48 and 50 heated by the cartridge heaters 36, and are subjected to the flow molding process during the above-indicated heating and pressing operations.

That is, the heating and pressing operations are performed on the base-portion sheets 20 and the decorative-spot-portion segments 22 which have been impregnated with the melamine resin to cut the hydrogen bonds, so that shearing forces act on the fiber cells of the base-portion sheets 20 and the decorative-spot-portion segments 22, and the relative positions of the fiber cells are changed. As a result, the base-portion sheets 20 and the decorative-spot-portion segments 22 (mainly, the base-portion sheets 20) flow within the forming cavity 52 formed between the upper die 30 and the lower die 28, so that the forming cavity 52 and the fixing-hook forming cavities 44 are filled with the base-portion sheets 20 and the decorative-spot-portion segments 22. In this respect, it is noted that the base-portion sheets 20 and the decorative-spot-portion segments 22 are generally pressed in the flow molding process, with a pressure of about 50-200 MPa.

It is noted that while the plurality of decorative-spot-portion segments 22 not only flow and move by themselves, but also are moved together with the flows and movements of the base-portion sheets 20, in the above-described flow molding process, distances or amounts of the movements of the decorative-spot-portion segments 22 from their original positions at the time when the segments 22 are accommodated in the recess 32 are not considerably large. It is also noted that since the plurality of decorative-spot-portion segments 22 are deformed while being subjected to the flow molding process together with the plurality of base-portion sheets 20, the boundary (indicated by two-dot chain lines in FIG. 6) between those sheets 20 and segments 22 after termination of the flow molding process is unclear or obscure, that is, the segments 22 are integrated with the sheets 20. It is further noted that the outer profiles of the decorative-spot-portion segments 22 are irregularly deformed in the flow molding process, so that the segments 22 as a whole exhibit a natural appearance (shown in FIG. 1) similar to that of natural decorative spots such as spots of the tortoiseshell, whereby the interior part 10 exhibits a novel appearance of decoration.

The base-portion sheets 20 and the decorative-spot-portion segments 22 filling the forming cavity 52 and the fixing-hook forming cavities 44 are kept subjected to the pressing force, so that the base-portion sheets 20 and the decorative-spot-portion segments 22 are compacted. The thus compacted base-portion sheets 20 and the decorative-spot-portion segments 22 are heated by the first, second and third pressure surfaces 46, 48 and 50 and the cavity surface 34, to the curing point of the melamine resin. In this respect, it is noted that the base-portion sheets 20 and the decorative-spot-portion segments 22 are kept pressed by the upper die 30 and the lower die 28, for about five minutes, for example.

Thus, the base-portion sheets 20 and the decorative-spot-portion segments 22 are given (formed to have) a permanent shape corresponding to the forming cavity 52, whereby the base portion 12 and the decorative spot portions 14 are eventually formed. The surfaces of the base portion 12 and the decorative spot portions 14 which are held in contact with the cavity surface 34 give the decorative design surface 16 of the interior part 10. At the same time, the fixing hooks 18 are formed integrally with the base portion 12 such that the fixing hooks 18 extend from the back surface of the base portion 12. Further, the base portion 12 and the decorative spot portions 14 are formed integrally with each other in the forming cavity 52, to obtain the interior part 10 in which some and the other of the decorative spot portions 14 are respectively integrally embedded within and exposed on the front and back surfaces of the base portion 12. It is considered that the base portion 12 and the decorative spot portions 14 are integrated into a one-piece body, owing to bonding of the melamine resin contained in the base portion 12 (the base-portion sheets 20) and the melamine resin contained in the decorative spot portions 14 (the decorative-spot-portion segments 22) to each other.

Then, the upper die 30 and the lower die 28 are spaced apart from each other, and the one-piece body consisting of the base portion 12 and the decorative spot portions 14 is removed from the upper die 30 and the lower die 28. Thus, the interior part 10 having the structure shown in FIG. 1 is produced.

It will be understood from the foregoing description that the interior part 10 according to the present embodiment is an integral body consisting of the translucent base portion 12 and the plurality of decorative spot portions 14 whose degree of translucency is different from that of the base portion 12, and that the base portion 12 is formed with a predetermined thickness, while some and the other of the plurality of decorative spot portions 14 are respectively integrally embedded within and exposed on the front and back surfaces of the base portion 12 in the predetermined pattern of local arrangement, so that the decorative design surface 16 exhibits a so-called "tortoiseshell" appearance of decoration giving a texture different from that of the prior art formed ligneous body, whereby the interior part 10 exhibits a novel handsome appearance. In addition, the base portion 12 and the decorative spot portions 14 which are formed by subjecting the resin-impregnated ligneous materials to the flow molding process can be given desired degrees of translucency.

Further, the interior part 10 having the decorative design surface 16 exhibits a deep three-dimensional excellent appearance in design, owing to the formation of the base portion 12 with the predetermined thickness, and the embedment and exposure of the plurality of decorative spot portions 14 within and on the front and back surfaces of the base portion 12, in the predetermined pattern of local arrangement, that is, owing to different distances of the decorative spot portions 14 from the front surface (the decorative design surface 16) of the interior part 10.

According to the method of producing the interior part 10 in the present embodiment, the plurality of base-portion sheets 20 and the plurality of decorative-spot-portion segments 22 accommodated in the forming cavity 52 are subjected to the flow molding process such that the base-portion sheets 20 in the form of flat sheets are superposed on each other while some and the other of the decorative-spot-portion segments 22 in the form of pieces are interposed between the adjacent ones of the base-portion sheets 20 and disposed on the upper and lower surfaces of the uppermost and lowermost ones of the base-portion sheets 20 in the predetermined pattern of local arrangement or distribution. Although the decorative-spot-portion segments 22 are moved in the flow molding process, the distances or amounts of the movements of the decorative-spot-portion segments 22 from their original positions at the time when the segments 22 are accommodated in the forming cavity 52 (the recess 32) are not considerably large. Accordingly, the decorative spot portions 14 are advantageously formed at the desired positions, so that the interior part 10 exhibits an intended appearance in design.

In addition, the decorative spot portions 14 are formed integrally with the base portion 12 by the flow molding process such that the boundary between the base portion 12 and the decorative spot portions 14 is unclear or obscure, so that the interior part 10 is effectively prevented from having unnatural stripes on the decorative design surface 16. Further, the decorative spot portions 14 are given natural outer profiles similar to those of natural decorative spots such as spots of a tortoiseshell, whereby the interior part 10 exhibits a natural excellent appearance in design. In addition, the decorative spot portions 14 are formed from the plurality of decorative-spot-portion segments 22, so that the interior part 10 can be advantageously given a more natural appearance in design with the decorative-spot-portion segments 22 having different sizes or outer profiles, without uniformity in design of the decorative spot portions 14.

In the present embodiment, the base portion 12 and the decorative spot portions 14 are formed of the respective resin-impregnated ligneous materials of agathis and cedar having respective different color tones or tints, so that the base portion 12 and the decorative spot portions 14 can be given suitably selected different degrees of translucency. Further, the base portion 12 and the decorative spot portions 14 are formed as a result of curing of the melamine resin with which the fiber cells are impregnated. Therefore, the interior part 10 is advantageously given excellent scratch-, water- and weather-proof properties, without a need for coating the interior part 10 with a coating layer formed of a transparent resin. In addition, the interior part 10 is advantageously protected from its geometrical deformation due to its soaking with an aqueous component. Furthermore, the interior part 10 using the melamine resin in an amount as small as possible does not cause deterioration of preservation of resources and environments.

By the way, the interior part 10 having the structure shown in FIG. 1 may be produced by an alternative method different from the method described above. This alternative method of producing the interior part 10 will be described by reference to FIGS. 7-9.

Initially, a plurality of base-portion segments 54 in the form of small-sized rectangular pieces sliced from an agathis lumber are provided as a ligneous material for a base portion. Each of the base-portion segments 54 has a predetermined outer profile. On the other hand, a plurality of decorative-spot-portion segments 22 are provided as a ligneous material for decorative spot portions, as in the preceding embodiment.

Then, the fiber cells and their walls of the base-portion segments 54 and the decorative-spot-portion segments 22 are impregnated with an aqueous solution of a melamine resin. This impregnating step is the same as in the method in the preceding embodiment. Namely, the base-portion segments 54 and the decorative-spot-portion segments 22 are immersed in the aqueous melamine resin solution in a bath disposed within a pressure vessel, and the pressure within the pressure vessel is alternately reduced and raised to the same pressure values as in the impregnating step described above with respect to the preceding embodiment.

Then, the base-portion segments 54 and the decorative-spot-portion segments 22 which have been impregnated with the aqueous melamine resin solution are taken out of the pressure vessel, and are dried. Thus, the plurality of base-portion segments 54 impregnated with the resin material are obtained as the base-portion ligneous material, while the plurality of decorative-spot-portion segments 22 impregnated with the resin material are obtained as the decorative-spot-portion ligneous material.

The plurality of base-portion segments 54 and the plurality of decorative-spot-portion segments 22 thus obtained are subjected to a compression flow molding process, by using the heating and pressing device 24 used in the method of production described above, to produce the desired interior part 10.

Figure 7:
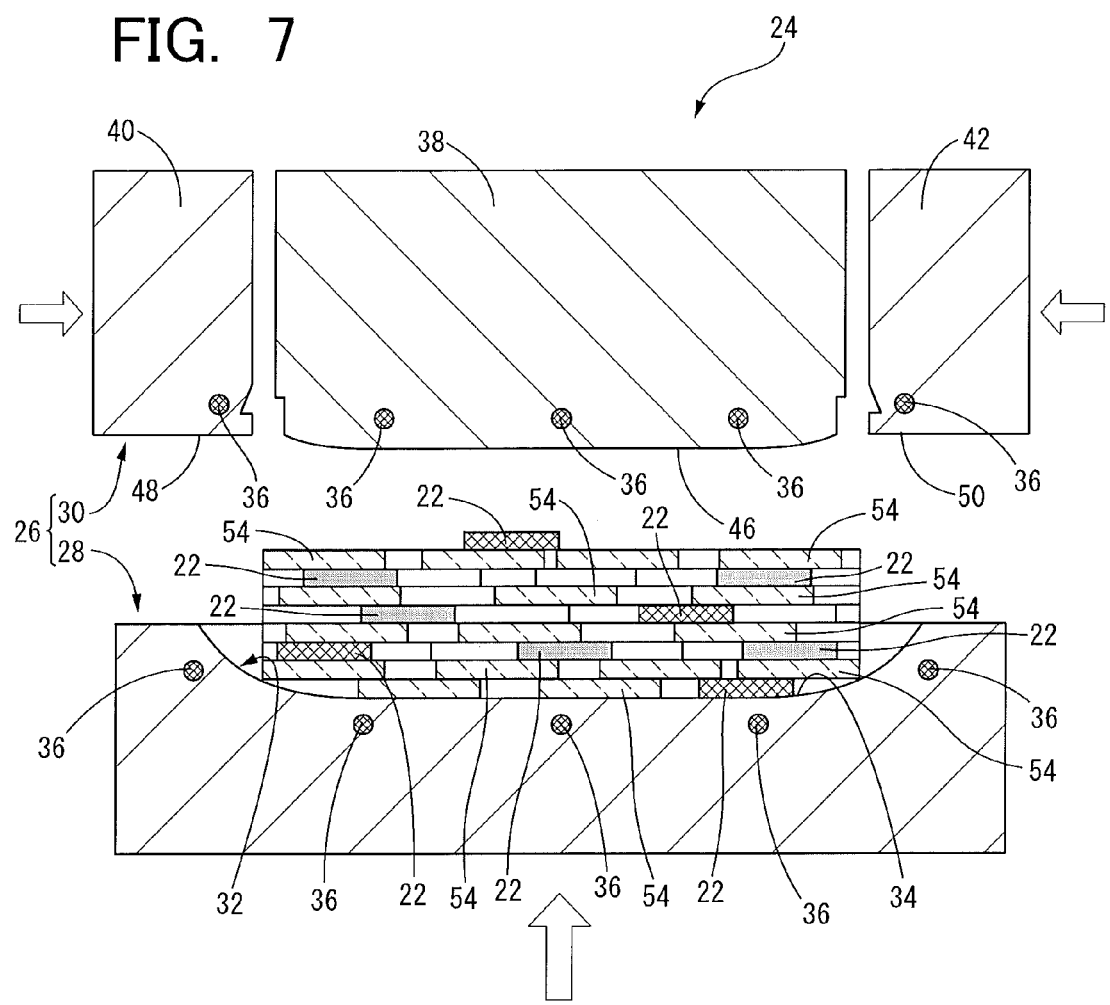
FIG. 7 is a schematic cross sectional view showing an example of a step of a method of producing the formed ligneous body of FIG. 1 in another embodiment of this invention, in which the base-portion ligneous material and the decorative-spot-portion ligneous material are set in the forming mold of the heating and pressing device.

To perform the flow molding process with respect to those base-portion segments 54 and decorative-spot-portion segments 22, these segments 54 and 22 are accommodated in the recess 32 of the lower die 28, in the predetermined pattern of local arrangement, as shown in FIG. 7, while the upper die 30 and the lower die 28 are vertically spaced apart from each other.

Figure 8:
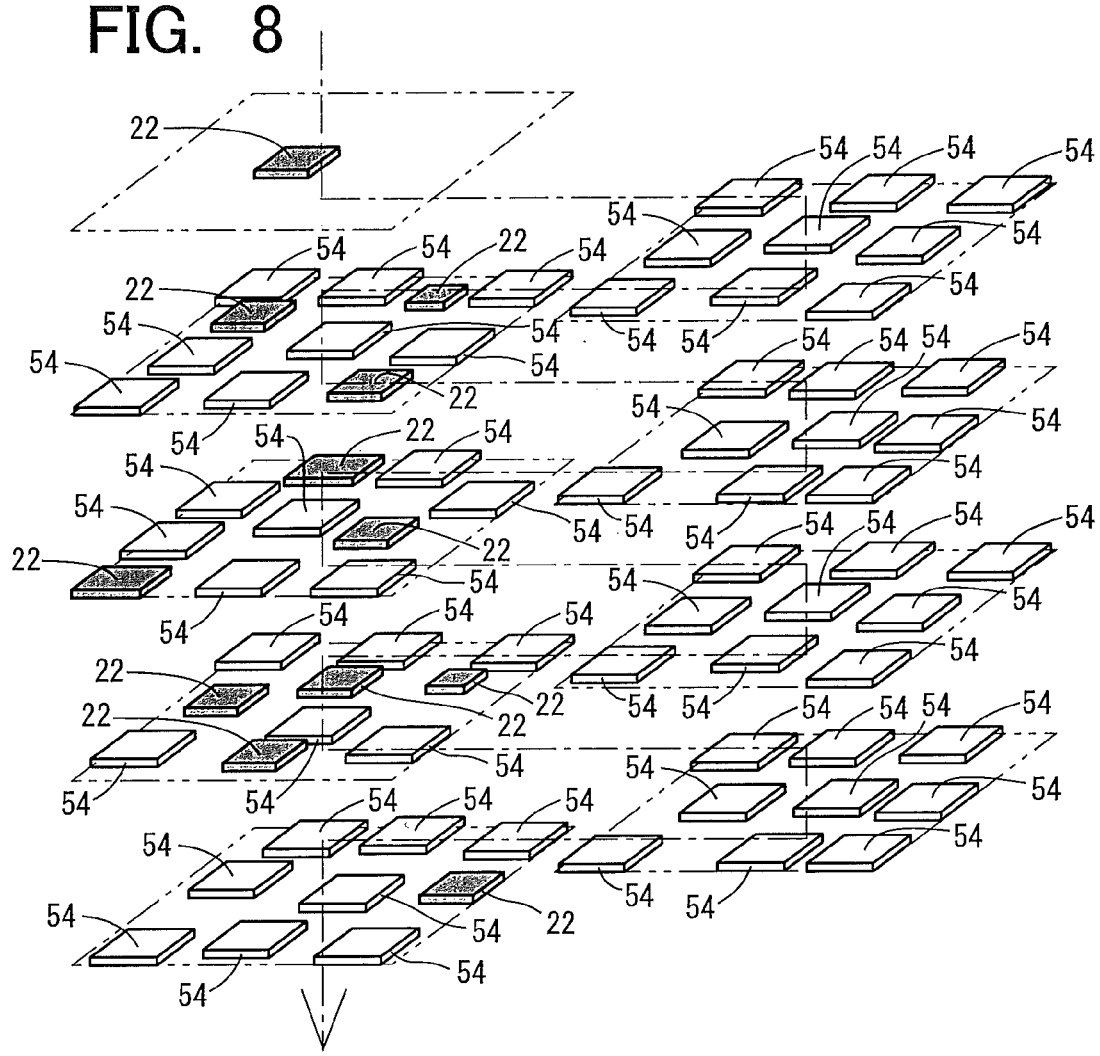
FIG. 8 is a schematic perspective view illustrating the base-portion ligneous material and the decorative-spot-portion ligneous material which are superposed on each other in the step shown in FIG. 7.

That is, the plurality of base-portion segments 54 and the plurality of decorative-spot-portion segments 22 are accommodated in the recess 32 such that the segments 22 are locally distributed at predetermined positions while the segments 54 are disposed so as to fill spaces among the segments 22 such that the segments 54 are placed on mutually spaced-apart parallel planes (indicated by two-dot chain lines in FIG. 8) and superposed on each other, as shown in FIG. 8. Further, one of the decorative-spot-portion segments 22 is disposed on the upper surface of one of the base-portion segments 54 placed on the uppermost one of the above-indicated planes (as seen in the direction of superposition of the segments 54 and 22; as seen in FIGS. 7 and 8) while another of the decorative-spot-portion segments 22 is placed on the lowermost one of the above-indicated planes of the base-portion segments 54 (such that this another decorative-spot-portion segment 22 is held in contact with the cavity surface 34).

Then, the plurality of base-portion segments 54 and the plurality of decorative-spot-portion segments 22 thus accommodated in the recess 32 are heated and pressed between the first, second and third pressure surfaces 46, 48 and 50 of the upper die 30 (the first, second and third split-die members 38, 40 and 42) and the cavity surface 34 of the lower die 28, as in the preceding embodiment.

Figure 9:
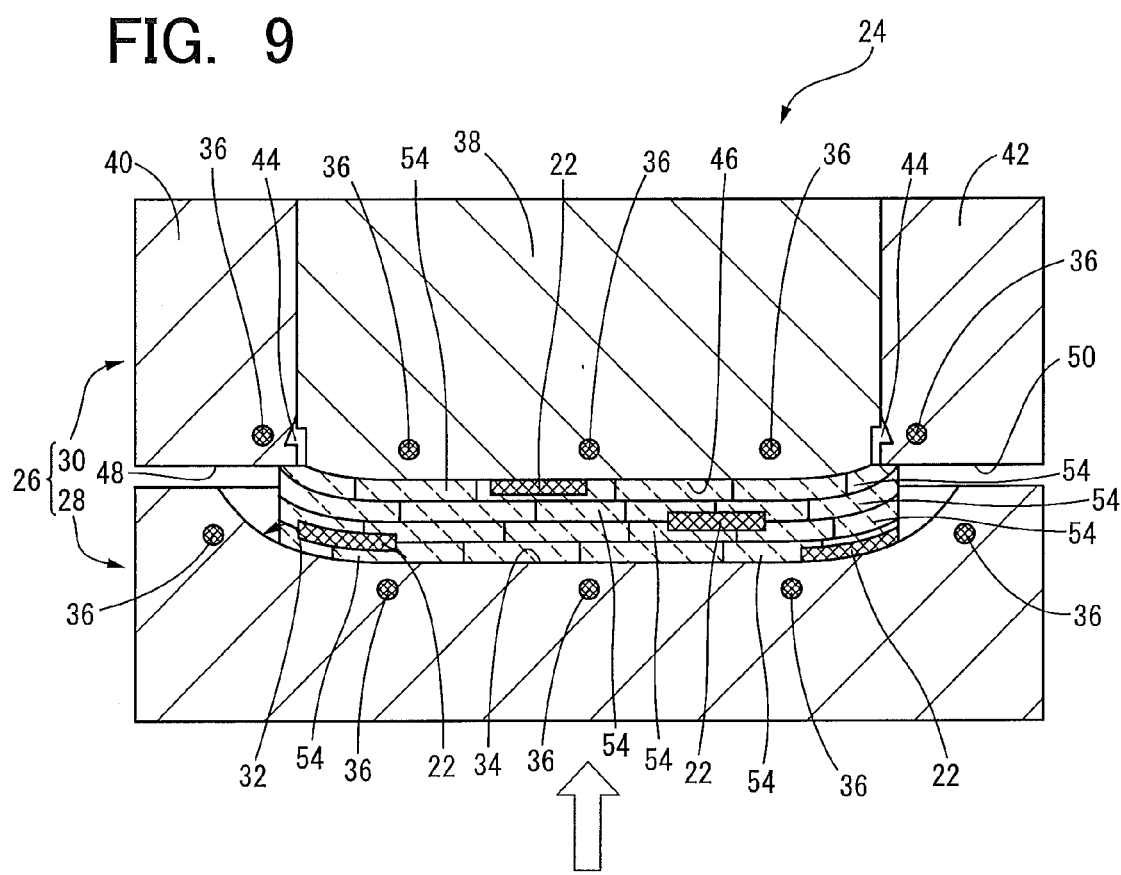
FIG. 9 is a schematic cross sectional view showing an example of a step implemented following the step shown in FIG. 7, when the upper die of the forming mold has been brought into an abutting contact with the upper surface of the base-portion ligneous material in the process of the closing action of the forming mold.

The second and third split-die members 40 and 42 are brought into abutting contact with the first split-die member 38 to form the upper die 30, while at the same time the lower die 28 is moved upwards, as shown in FIG. 9, so that the plurality of base-portion segments 54 and the decorative-spot-portion segments 22 are heated and pressed, whereby the segments 54 and 22 are forced to flow. Namely, the base-portion and decorative-spot-portion segments 54 and 22 are forced to flow and pressed into contact with each other in the direction perpendicular to the direction of their superposition, and compressed against each other in the direction of their superposition, so that the segments 54 and 22 are bonded together in those two directions.

Subsequently, the base-portion segments 54 and the decorative-spot-portion segments 22 are subjected to the flow molding process, in a manner similar to that described above by reference to FIG. 6.

In the present embodiment, there exist gaps among the base-portion and decorative-spot-portion segments 54 and 22 accommodated in the forming cavity 52 (the recess 32), while those segments 54 and 22 are subjected to the flow molding process. Accordingly, the distances or amounts of movements of the decorative-spot-portion segments 22 are larger than in the preceding embodiment. However, the distances or amounts of the movements of the decorative-spot-portion segments 22 from their original positions at the time when the segments 22 are accommodated in the recess 32 are not considerably large.

Thus, the base-portion segments 54 and the decorative-spot-portion segments 22 are given (formed to have) a permanent shape corresponding to the forming cavity 52, whereby the base portion 12 and the decorative spot portions 14 are eventually formed. Then, the upper die 30 and the lower die 28 are spaced apart from each other, and the one-piece body consisting of the base portion 12 and the decorative spot portions 14 is removed from the upper die 30 and the lower die 28. Thus, the interior part 10 having the structure shown in FIG. 1 is produced.

It will be understood from the foregoing description that like the method of production according to the preceding embodiment, the method of production according to the present embodiment permits advantageous production of the interior part 10 having the excellent properties described above with respect to the preceding embodiment.

In particular, the method according to the present embodiment is advantageous in that both of the base-portion ligneous material (the base-portion segments 54) and the decorative-spot-portion ligneous material (the decorative-spot-portion segments 22) take the form of small-sized pieces, permitting the base-portion and decorative-spot-portion ligneous materials to be subjected to the flow molding process while these ligneous materials are accommodated in the forming cavity 54 (the recess 32) in the predetermined pattern of local arrangement, irrespective of the outer profile of the interior part 10 (the formed ligneous body) to be produced. Accordingly, the same ligneous materials can be used for production of various kinds of the formed ligneous body, so that the cost of production of the formed ligneous body can be reduced. Further, the lumbers used as the ligneous materials can be effectively utilized as the base-portion and decorative-spot-portion segments 54 and 22, with a reduced amount of wasting of the lumbers.

While the embodiments of this invention have been described above for illustrative purpose only, it is to be understood that the invention is not limited to the details of the illustrated embodiments.

Figure 10:
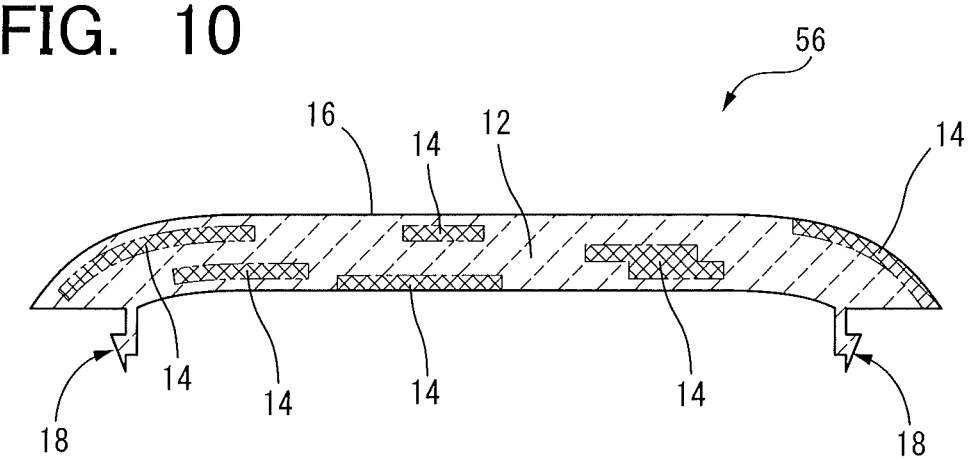
FIG. 10 is a schematic cross sectional view corresponding to that of FIG. 2, showing a formed ligneous body having a structure according to a further embodiment of this invention.

In the illustrated embodiments, the decorative spot portions 14 are formed without mutual overlapping in the direction of thickness of the interior part 10. However, some of the decorative spot portions 14 may be formed so as to overlap each other in the direction of thickness of the interior part 10, as shown in FIG. 10. In this case, the decorative design surface 16 of an interior part 56 has local areas wherein the decorative spot portions 14 have different tones (different color tones or tints), so that the interior part 56 exhibits a more excellent appearance in design.

The shape of the decorative-spot-portion ligneous material (the decorative-spot-portion segments 22) used for forming the decorative spot portions 14 is not limited to the rectangular shape, but may be a circular, elliptical, polygonal or any other shape suitably selected.

Further, the two alternative methods of production in the illustrated embodiments may be suitably combined with each other. For instance, the two base-portion sheets 20 may be used as the uppermost and lowermost layers of the base-portion ligneous material, and a plurality of base-portion segments 54 and a plurality of decorative-spot-portion segments 22 may be superposed on each other between the two base-portion sheets 20. In this case, the lumbers used as the ligneous materials can be effectively utilized as the base-portion segments 54 and the decorative-spot-portion segments 22, with a reduced amount of wasting of the lumbers. Further, ease of handling of the ligneous materials during the flow molding process can be improved by the two base-portion sheets 20 respectively covering the uppermost and lowermost ones of the base-portion segments 54 and the decorative-spot-portion segments 22.

In addition, the base-portion segments 54 and the decorative-spot-portion segments 22 used in the second embodiment may be subjected to the flow molding process within the forming cavity 52 while the forming cavity 52 is suitably evacuated, in order to advantageously prevent air from remaining within the gaps among the base-portion segments 54 and the decorative-spot-portion segments 22, for effectively preventing deterioration of decoration of the formed ligneous body due to air bubbles left therein.

Further, the ligneous materials used as the base-portion ligneous material (20, 54) and the decorative-spot-portion ligneous material (22) are not particularly limited, but may be suitably selected from known materials, depending upon the required properties. In the illustrated embodiments, the lumbers having different color tones or tints are used for the base-portion ligneous material (20, 54) and the decorative-spot-portion ligneous material (22). However, it is possible to effectively use both of a peripheral portion of a tree, which has a comparatively light or pale color, and a core portion of the tree, which has a comparatively deep color, so that the formed ligneous body exhibits different color tones owing to the use of the different portions of the tree.

In addition, the ligneous materials used as the base-portion ligneous material (20, 54) and the decorative-spot-portion ligneous material (22) may be subjected to a bleaching treatment so that the interior part 10 has a desired degree of translucency and exhibits a desired appearance. For example, one of those ligneous materials which is required to have a higher degree of translucency (the base-portion ligneous material in the illustrated embodiments) is subjected to the bleaching treatment, to thin the color of this ligneous material, for increasing the translucency of the corresponding portion (the base portion 12 in the illustrated embodiments) of the formed ligneous body. The bleaching treatment may be performed in various known manners, for instance, by immersing the relevant ligneous material in a solution of a hydrogen-peroxide-based or chlorite-based oxidizing and bleaching agent, or by applying the oxidizing and bleaching agent to the ligneous material by coating or spraying. Further, the base-portion ligneous material (20, 54) and the decorative-spot-portion ligneous material (22) may be subjected to a coloring treatment for giving the formed ligneous body the desired translucency and appearance.

In the illustrated embodiments, the ligneous material (cedar) used as the decorative-spot-portion ligneous material (22) has a deeper color than the ligneous material (agathis) used as the base-portion ligneous material (20, 54), so that the decorative spot portions 14 has a lower degree of translucency than the base portion 12. However, the decorative spot portions 14 may have a higher degree of translucency than the base portion 12. In this case, the translucent base portion 12 having a deep brown color and the decorative spot portions 14 having the lighter color than the base portion 12 are visible on the decorative design surface 16, so that the formed ligneous body exhibits an excellent appearance.

As the resin material with which each ligneous material is impregnated, a phenolic resin, a urea resin and any known resin material other than the melamine resin used in the illustrated embodiments may be used. According to the present invention, it is preferable to use the melamine resin having a comparatively light color, for example, for making a good use of the color tones of the different kinds of ligneous material. In this respect, it is noted that each ligneous material may be purposely impregnated with a colored resin material, or may be colored with a dye or pigment, so that the formed ligneous body exhibits a high degree of originality in design.

Although in the illustrated embodiments, the fiber cells and their walls of both of the base-portion ligneous material (20, 54) and the decorative-spot-portion ligneous material (22) are impregnated with the same kind of thermosetting resin, i.e. the melamine resin, the base-portion ligneous material (20, 54) and the decorative-spot-portion ligneous material (22) may be impregnated with respective different kinds of resin material. In this respect, it is noted that the base portion 12 and the decorative spot portions 14 can be advantageously bonded together with a higher degree of stability, where the same kind of resin material is used, or two different kinds of resin material such as the melamine resin and the urea resin which can be chemically mixed or combined with each other are used.

Further, the resin material with which the base-portion ligneous material (20, 54) and the decorative-spot-portion ligneous material (22) are impregnated may be a thermoplastic resin in the form of a thermoplastic acrylic resin (such as a polymer of an acrylic monomer such as methylacrylate and methylmethacrylate). In this case, however, a treatment such as a known treatment to acetylate the cellulose of the fiber cells of the base-portion ligneous material (20, 54) and the decorative-spot-portion ligneous material (22) is preferably performed to cut the hydrogen bonds among the fiber cells of those base-portion ligneous material (20, 54) and decorative-spot-portion ligneous material (22), before those ligneous materials are impregnated with the thermoplastic resin.

The ligneous materials may be impregnated with a resin material, by any known method. For instance, the ligneous materials are immersed in an aqueous solution of the resin material, or coated with the aqueous solution of the resin material, so that the ligneous materials are impregnated with the resin material. Alternatively, the ligneous materials are coated with the aqueous solution of the resin material, by using a sponge-roll coater, a natural reverse coater or a flow coater.

It is also noted that bamboos may be used as the base-portion and decorative-spot-portion ligneous materials, in place of lumbers or timbers.

It will be understood that the principle of the present invention is suitably applicable to a formed ligneous body other than an interior part of an automotive vehicle, and a method of producing the same.

It is to be understood that the present invention may be embodied with various changes, modifications and improvements not described herein, which may occur to those skilled in the art, without departing from the spirit and scope of this invention.

The invention claimed is:

1. A formed ligneous body having a front decorative design surface and which is formed of ligneous materials, each impregnated with a resin material, by subjecting the ligneous materials to a flow molding process in which the ligneous materials are heated and pressed such that the ligneous materials are forced to flow and shaped while the ligneous materials are compressed, the formed ligneous body comprising:
    a base portion having translucency; and
    a plurality of decorative spot portions, whose degree of translucency is different from and lower than that of said base portion, and which are integrated with the base portion,
    wherein the base portion and the decorative spot portions are formed of respective resin-impregnated ligneous materials having respective different color tones,
    wherein the base portion is formed with a predetermined thickness, and
    wherein the plurality of decorative spot portions are disposed in a predetermined pattern of local arrangement, such that each of the plurality of decorative spot portions are integrally embedded within or exposed on a front or back surface of the base portion.

2. The formed ligneous body according to claim 1, wherein either one of said respective resin-impregnated ligneous materials of said base portion and said decorative spot portions is formed by using a peripheral portion of a lumber, while the other of said respective resin-impregnated ligneous materials is formed by using a core portion of a lumber.

3. The formed ligneous body according to claim 1, wherein either one of said respective resin-impregnated ligneous materials of said base portion and said decorative spot portions is subjected to a bleaching treatment.

4. The formed ligneous body according to claim 1, wherein said respective resin-impregnated ligneous materials of said base portion and said decorative spot portions are impregnated with a melamine resin.

5. An automotive vehicle interior part consisting of the formed ligneous body according to claim 1.

6. A method of producing the formed ligneous body as defined in claim 1, the method comprising the steps of:
    providing a plurality of base-portion sheets for forming said base portion, and a plurality of decorative-spot-portion segments for forming said plurality of decorative spot portions, by using respective ligneous materials which have respective different color tones and which are impregnated with resin materials;

superposing said plurality of base-portion sheets on each other, disposing said plurality of decorative-spot-portion segments in a predetermined pattern of local arrangement, such that each of the plurality of decorative-spot-portion segments is embedded between adjacent ones of said base-portion sheets or exposed on at least one of an upper surface of an uppermost one of the base-portion sheets and a lower surface of a lowermost one of the base-portion sheets, and accommodating the plurality of base-portion sheets and the plurality of decorative-spot-portion segments within a forming cavity for forming the formed ligneous body; and subjecting said plurality of base-portion sheets and said plurality of decorative-spot-portion segments accommodated within said forming cavity, to a flow molding process in which the base-portion sheets and the decorative-spot-portion segments are compressed in a direction of superposition of the base-portion sheets, and in which the resin materials contained in the base-portion sheets and the decorative-spot-portion segments are cured or solidified, so that said base portion and said decorative spot portions are integrated with each other, such that each of said plurality of decorative spot portions is embedded within or exposed on the front or back surface of said base portion formed with the predetermined thickness.

7. The method of producing the formed ligneous body according to claim 6, wherein said flow molding process is practiced while said forming cavity is evacuated.

8. A method of producing the formed ligneous body as defined in claim 1, the method comprising the steps of:
providing a plurality of base-portion segments for forming said base portion, and a plurality of decorative-spot-portion segments for forming said plurality of decorative spot portions, by using respective ligneous materials which have respective different color tones and which are impregnated with resin materials;

accommodating said plurality of base-portion segments and said plurality of decorative-spot-portion segments in a forming cavity for forming the formed ligneous body such that the plurality of base-portion segments and the plurality of decorative-spot-portion segments are superposed on each other and such that the decorative-spot-portion segments are locally arranged at predetermined positions; and subjecting said plurality of base-portion segments and said plurality of decorative-spot-portion segments accommodated within said forming cavity, to a flow molding process in which the base-portion segments and the decorative-spot-portion segments are compressed in a direction of superposition of the base-portion segments and the decorative-spot-portion segments, and in which the resin materials contained in the base-portion segments and the decorative-spot-portion segments are cured or solidified, so that said base portion and said decorative spot portions are integrated with each other, such that each of said plurality of decorative spot portions is embedded within or exposed on the front or back surface of said base portion formed with the predetermined thickness.

9. The method of producing the formed ligneous body according to claim 8, wherein said flow molding process is practiced while said forming cavity is evacuated.

10. A method of producing the formed ligneous body as defined in claim 1, the method comprising the steps of:
providing two base-portion sheets and a plurality of base-portion segments for forming said base portion, and a plurality of decorative-spot-portion segments for forming said plurality of decorative spot portions, by using respective ligneous materials which have respective different color tones and which are impregnated with resin materials;

accommodating said two base-portion sheets, said plurality of base-portion segments and said plurality of decorative-spot-portion segments in a forming cavity for forming the formed ligneous body such that the plurality of base-portion segments and the plurality of decorative-spot-portion segments are interposed between the two base-portion sheets and such that the decorative-spot-portion segments are locally arranged at predetermined positions; and subjecting said two base-portion sheets, said plurality of base-portion segments and said plurality of decorative-spot-portion segments accommodated within said forming cavity, to a flow molding process in which the base-portion sheets, the base-portion segments and the decorative-spot-portion segments are compressed in a direction of superposition of the two base-portion sheets, and in which the resin materials contained in the base-portion sheets, the base-portion segments and the decorative-spot-portion segments are cured or solidified, so that said base portion and said decorative spot portions are integrated with each other, such that each of said plurality of decorative spot portions is embedded within or exposed on the front or back surface of said base portion formed with the predetermined thickness.

11. The method of producing the formed ligneous body according to claim 10, wherein said flow molding process is practiced while said forming cavity is evacuated.

* * * * *